United States Patent [19]

Chattopadhayay et al.

[11] 3,936,237
[45] Feb. 3, 1976

[54] MEMBRANE-AIR PUMP ADAPTED TO FUNCTION AS A TACHOMETER

[75] Inventors: Asoke Chattopadhayay, Norf; Georg Habel, Nievenheim, both of Germany

[73] Assignee: Deutsche Vergaser GmbH & Co. K.G., Neuss, Germany

[22] Filed: Nov. 15, 1973

[21] Appl. No.: 416,283

[30] Foreign Application Priority Data
Mar. 14, 1973  Germany............................ 2312607

[52] U.S. Cl. ..................... 417/311; 73/521; 346/18
[51] Int. Cl.² .. F04B 49/00; G01D 9/00; G01P 3/26
[58] Field of Search .......... 417/534, 535, 300, 310, 417/311, 471, 286; 73/523, 521; 346/18

[56] References Cited
UNITED STATES PATENTS

| 42,956 | 5/1864 | Mackerley | 73/523 |
|---|---|---|---|
| 862,867 | 8/1907 | Eggleston | 417/395 |
| 1,052,369 | 2/1913 | Nelson | 73/523 |
| 2,210,154 | 8/1940 | Stevens et al. | 346/18 |
| 2,457,571 | 12/1948 | Leibing | 417/286 |
| 2,509,022 | 5/1950 | Turnquist | 417/534 |
| 3,036,524 | 5/1962 | Johnson | 417/471 |
| 3,103,891 | 9/1963 | Fulton et al. | 417/300 |
| 3,184,978 | 5/1965 | General et al. | 73/523 |
| 3,189,909 | 6/1965 | Suter | 346/18 |
| 3,415,194 | 12/1968 | Connelly | 417/310 |
| 3,509,776 | 5/1970 | Schaeffer | 73/521 |
| 3,547,559 | 12/1970 | Tittmann | 417/300 |

FOREIGN PATENTS OR APPLICATIONS

| 44,169 | 8/1934 | France | 417/471 |
|---|---|---|---|
| 585,187 | 12/1924 | France | 417/311 |
| 901,626 | 1/1954 | Germany | 417/536 |
| 600,237 | 11/1925 | France | 417/536 |

*Primary Examiner*—William L. Freeh
*Attorney, Agent, or Firm*—Waters, Schwartz & Nissen

[57] ABSTRACT

A membrane-air pump functioning as a tachometer, having a first flow circuit whose pneumatic flow or pressure values serve as speed-dependent guide parameters for control or regulating apparatus. A second flow circuit leads from the pressure or delivery side of the membrane-air pump to the suction side thereof, and in which there is incorporated a flow throttle and a spring-loaded relief pressure valve in series connection with the second flow circuit. Preferably, the flow throttle, as well as the relief pressure valve are adjustable.

1 Claim, 2 Drawing Figures

3,936,237

MEMBRANE-AIR PUMP ADAPTED TO FUNCTION AS A TACHOMETER

FIELD OF THE INVENTION

The present invention relates to a membrane-air pump functioning as a tachometer, having a first flow circuit whose pneumatic flow or pressure values serve as speed-dependent guide parameters for control or regulating apparatus.

DISCUSSION OF THE PRIOR ART

It is known that the pressure increase on the pressure or delivery side of a membrane-air pump is, to a large extent, proportional to the speed of its rotating drive. Basically, membrane-air pumps of that type are thereby also adapted to be utilized as tachometers for the control elements of a fuel injection regulator for internal combustion engines. However, relatively small deviations in the flow and pressure values become noticable to a disturbing extent. These deviations, however, cannot be avoided in manufacture through mass production. Furthermore, in a fuel injection regulator a non-variable proportionality between speed and the pressure and, respectively, flow values is undesirable.

SUMMARY OF THE INVENTION

Accordingly, it is an object of the present invention to purposefully vary the proportionality between speed and the pressure and respective flow values, and to eliminate the unavoidably considerable tolerances in the flow and pressure values due to mass production manufacture, while concurrently reducing manufacturing costs.

Inventively the foregoing object is obtained in that there is provided a second flow circuit which leads from the pressure or delivery side of the membrane-air pump to the suction side thereof, and in which there is incorporated a flow throttle and a spring-loaded relief pressure valve in series connection with the second flow circuit. Preferably, the flow throttle, as well as the relief pressure valve are adjustable.

The particular advantages of the invention lie in that through an adjustment in the operating pressure of the relief pressure valve, there is facilitated the selection of a predetermined speed, until up the latter the pressure increase at the delivery side of the pump is extremely steep, and from this speed on thereafter, according to the adjustment of the flow throttle, extends more or less level. In a fuel injection regulator for an internal combustion engine the foregoing concerns itself with the idling speed. Preferably, the flow throttle is adjusted so that for each individual membrane-air pump, a completely predetermined maximum speed has associated therewith a completely predetermined pressure at the delivery side of the pump. Thereby there are eliminated not only the unavoidable manufacturing tolerances. Also all deviations of the pressure and, respectively, flow values which are caused by the wear and changes of the constructional components, may be eliminated through subsequent adjustment. It is advantageous, that for the idling speed of an internal combustion engine there is present an appreciable control or regulating pressure, while the further pressure increase follows move level at a smaller proportionality factor, so that the maximum pressure and the therewith associated technical requirement becomes substantially lower than that for presently used membrane-air pumps.

BRIEF DESCRIPTION OF THE DRAWINGS

An example of the invention is described in the following detailed description, as illustrated in the accompanying drawing, in which.

DETAILED DESCRIPTION

Figure 1:
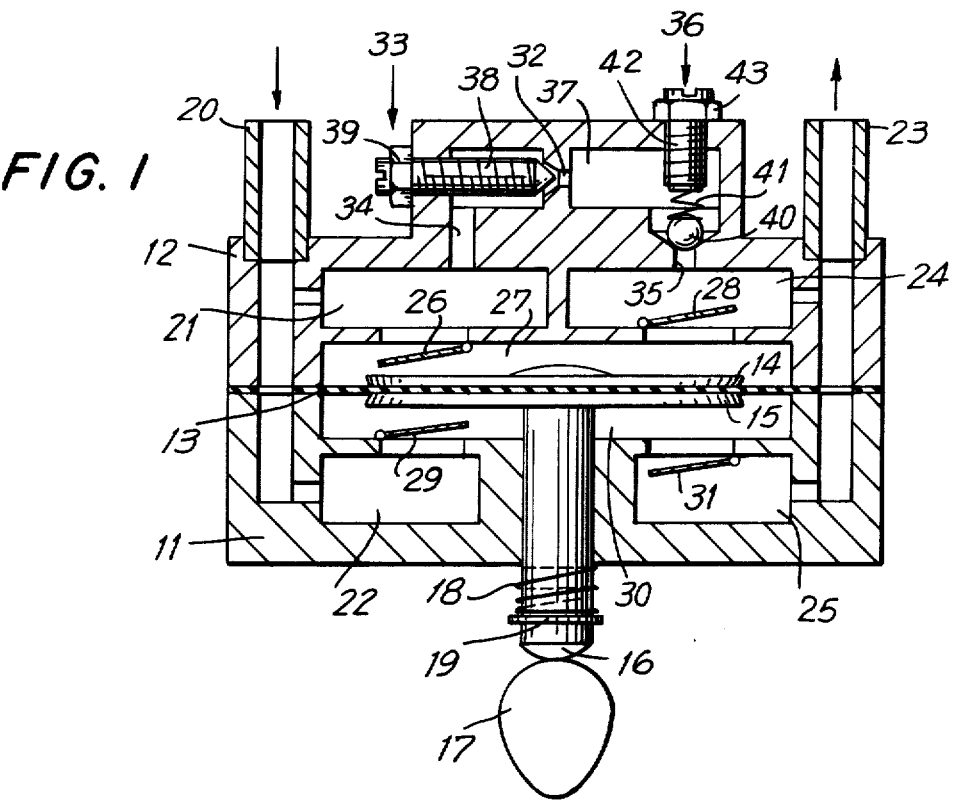
FIG. 1 shows a sectional view of a membrane-air pump constructed according to the invention.

Between a lower pump portion 11 and an upper pump portion 12 there is located a membrane 13. The membrane, in a known manner, is clamped between membrane plates 14 and 15, and, together with the membrane plates, fastened to a slidably supported pump rod 16. The pump rod 16 slides on a cam shaft 17. A return spring 18, which is upwardly supported against the lower pump portion 11 and downwardly against a ring 19 on the pump rod 16, is pre-tensioned so as to constantly pull the rod and membrane downwardly, whereby the membrane effects oscillating motions in conformance with the contour of the cam shaft 17 upon rotation of the latter.

An inlet nipple 20 is located in the upper pump portion 12, and is connected with the suction chambers 21 and 22 of the pump. An outlet nipple 23, which is connected with the pump pressure chambers 24 and 25, is similarly positioned in the upper pump portion 12.

The operating medium moves from the suction chamber 21, through an inlet valve 26, into the operating chamber 27, and from there through an outlet valve 28 into the pressure chamber 24. In parallel with this flow path, the operating medium moves from the suction chamber 22 through an inlet valve 29 into the operating chamber 30, and from there through an outlet valve 31 into the pressure chamber 25.

A flow circuit leads from the delivery side of the membrane-air pump through an aperture 35, a relief pressure valve 36, a chamber 37, an aperture 32, a flow throttle 33, and a channel 34, to the pump suction side.

The current throttle 33 consists of an adjusting screw 38 having a conical tip adapted to adjustably extend into the aperture 32, and of a control nut 39. The relief pressure valve 36 consists of a ball 40 which is adapted to close aperture 35, and is which loaded by means of a spring 41 having a pre-tensioned force adjustable by means of the control nut 43 provided on adjusting screw 42.

During the operation of the membrane-air pump there is formed between the outlet nipple 23 and the inlet nipple 20 an open or closed flow circuit with a fixedly adjusted load resistance. With an increasing speed there concurrently increases the pressure in the pressure chamber 24. As soon as the pressure has reached a predetermined value, the pre-tensioning of the spring 41 is exceeded, the relief pressure valve 36 opens, and return flow commences, limited by the adjustment of the flow throttle 33. From this time point on, upon increasing engine speed, further pressure increase in the pressure chamber 24, and in the therewith connected chambers and passages, continues in a more level manner.

Figure 2:
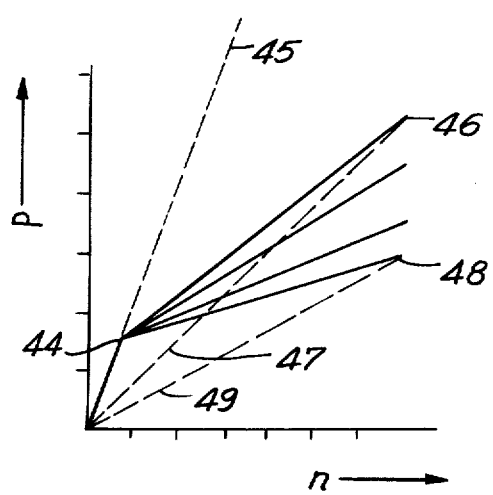
FIG. 2 shows a diagram illustrative of the correlation between the operating pressure and the engine speed.

In the diagram illustrated in FIG. 2, there is represented along the horizontal axis the engine speed, and along the vertical axis the pressure of the operating medium at the delivery side of the pump. The pressure sequence is illustrated for a membrane-air pump pursuant to the invention by the solidly shown lines. It is ascertainable that the pressure increases steeply with the machine speed, as long as the relief pressure valve is still closed. As soon as the relief pressure valve is opened, the further pressure increase occurs more level, in accordance with the adjustment of the flow throttle 33.

When the invention is utilized as the component of a fuel injection regulator for an internal combustion engine, the relief pressure valve 36 opens upon attaining of the idling speed.

The chain-dotted lines represent the pressure sequence of prior art membrane-air pumps. It may be ascertained from the diagram of FIG. 2 that the prior art membrane-air pumps are not suitable for fuel injection regulators. Assumed that at idling speeds a pump pressure must be present, which is required at a height through the subsequently switched-in control and regulating organs, as signified by graph point 44, then for increasing engine speeds the further pressure increase follows the chain-dotted line 45, and reaches a height finally at a maximum rotational speed which lies in excess of practical applicable limits.

Assumed that the still practical usably maximum pressure is at the maximum rotational speed designated by the point 46, then the pressure increase in a prior art membrane air pump will follow the chain-dotted line 47. At idling speed there is thus available a completely inadequate pump pressure for control and, respectively, regulating purposes. Even less desirable would be the pressure sequence, if for the purposes of reduction of the manufacturing costs for the pump, there is selected a maximum pressure which is designated by the point 48. The pressure increase then follows the chain-dotted line 49, and during idling speeds there is accordingly available for use only a still lower pressure.

While there has been shown what is considered to be the preferred embodiment of the invention, it will be obvious that modifications may be made which come within the scope of the disclosure of the specification.

What is claimed is:

1. In a positive displacement pump, a first flow circuit extending from a flow inlet at the suction side of the pump to a discharge at the delivery side of the pump providing flow or pressure values serving a speed-dependent guide values for control or regulating apparatus, said first flow circuit including a pump chamber; a flexible membrane dividing said pump chamber into first and second chamber portions sealed from each other; a first suction chamber communicating said first chamber portion with said flow inlet; a first pressure chamber communicating said first chamber portion with said pump discharge, a second suction chamber communicating said second chamber portion with said flow inlet; and a second pressure chamber communicating said second chamber portion with said pump discharge, the improvement comprising: a second flow circuit extending from said first pressure chamber upstream of said pump discharge to said first suction chamber; relief pressure valve means in said second flow circuit inhibiting flow therethrough below a predetermined low flow or pressure value at said pump discharge and permitting return flow therethrough from said first pressure chamber to said first suction chamber at and above said predetermined value; and adjustable throttle means in said second flow circuit located intermediate said relief pressure valve means and said first suction chamber and operable above said predetermined low flow or pressure for adjustably restricting the flow through said second flow circuit and controlling the flow or pressure values at said pump discharge.

* * * * *